United States Patent
Mehta (10) Patent No.: US 11,834,166 B2
(45) Date of Patent: Dec. 5, 2023

(54) SELF-BALANCING PROPELLER ASSEMBLY

(71) Applicant: IDEAFORGE TECHNOLOGY PVT. LTD., Mumbai (IN)

(72) Inventor: Ankit Mehta, Mumbai (IN)

(*) Notice: Subject to any disclaimer, the term of this patent is extended or adjusted under 35 U.S.C. 154(b) by 35 days.

(21) Appl. No.: 16/758,135

(22) PCT Filed: Oct. 25, 2018

(86) PCT No.: PCT/IB2018/058318
§ 371 (c)(1),
(2) Date: Apr. 22, 2020

(87) PCT Pub. No.: WO2019/082109
PCT Pub. Date: May 2, 2019

(65) Prior Publication Data
US 2020/0283137 A1    Sep. 10, 2020

(30) Foreign Application Priority Data
Oct. 25, 2017  (IN) .............................. 201721037828

(51) Int. Cl.
*B64C 27/51* (2006.01)
*F01D 5/16* (2006.01)
*F16F 15/36* (2006.01)
*G01M 1/32* (2006.01)

(52) U.S. Cl.
CPC ................ *B64C 27/51* (2013.01); *F01D 5/16* (2013.01); *F16F 15/36* (2013.01); *G01M 1/32* (2013.01); *F05D 2240/30* (2013.01); *F05D 2260/96* (2013.01)

(58) Field of Classification Search
CPC ........ B64C 11/008; B64C 27/51; G01M 1/32; F01D 5/16; F16F 15/32; F16F 15/36
See application file for complete search history.

(56) References Cited

U.S. PATENT DOCUMENTS

| 3,289,770 A | 12/1966 | Derschmidt | |
| 6,062,818 A * | 5/2000 | Manfredotti | B64C 27/001 416/145 |
| 2017/0297677 A1* | 10/2017 | Kiesewetter | B64C 11/008 |

FOREIGN PATENT DOCUMENTS

WO    WO-2019056892 A1 *  3/2019  ........... B64C 11/008

* cited by examiner

*Primary Examiner* — Woody A Lee, Jr.
*Assistant Examiner* — Cameron A Corday
(74) *Attorney, Agent, or Firm* — Jose Cherson Weissbrot (57) ABSTRACT

A device for self-balancing a rotating part, such as a propeller, along a given axis is disclosed. The propeller 102 coupled to, a drive shaft with freedom for linear movement along longitudinal axis L-L; at least one pair of levers 614/616, comprising a first lever 614-1/616-1 and a second lever 614-2/616-2, that are pivotally mounted on mounting plate 606 at two diametrically opposite points 618; and at least one pair of weights 622 fixed at external ends of the levers 614/616. inner ends of levers 614/616 are operatively coupled to the propeller 102 such that when propeller 102 undergoes a linear movement in any direction along the longitudinal, axis L-L due to unbalance, inner ends of levers are, moved to cause the weights 622 to move to provide a balancing force to neutralize the unbalance in the propeller. An embodiment with only one pair of levers is also disclosed.

12 Claims, 7 Drawing Sheets

SELF-BALANCING PROPELLER ASSEMBLY

TECHNICAL FIELD

The present disclosure relates generally to the field of rotary systems, and more particularly to a self-balancing propeller assembly of an unmanned aerial vehicle.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Vibrations area major factor in designing any system. Vibrations negatively affect safety and comfort of the system. They, have a direct influence on stability of the system and may even cause mechanical failures due to material fatigue. Any unbalance on a rotating part results in vibrations due to centrifugal force acting on unbalanced mass, frequency of the vibration being same as speed of the rotating part. Centrifugal force being proportional to square of speed, such unbalances assume importance in parts rotating at high speeds. Further, an unbalance mass rotating at speed equal to natural frequency of the system results in phenomenon of resonance, which can result in dangerously high amplitudes of vibration and corresponding stresses on mechanical pads.

A major source of vibrations in an Aerial Vehicle (AV) is rotary system. Rotor propellers, also known in the related art as blades, rotate at high speeds, and therefore, even small amount of unbalance in distribution of mass in the propellers can lead to large centrifugal forces leading to vibrations and undesirable inertia forces. Even though propeller blades are balanced before installation as part of manufacturing or assembly process, they undergo change with time due to various reasons like blade wear, water-ingress, slight accidental collisions, etc. Such changes may cause the propeller's Centre of Gravity (CG) to shift leading to unbalance causing vibrations on account of centrifugal force associated with the unbalanced mass.

Conventionally, effect of vibration is reduced by isolating vibrations by using devices such as vibration isolators, vibration dampers, vibration absorbers and vibration generators. However, these devices do not overcome the root cause of problem i.e. unbalance besides increasing cost of installation of rotor systems.

United States Patent Application number US20110129341A1 discloses a method for reducing vibration in a rotary system of an aircraft, for example an aeroplane or a rotorcraft, such as a helicopter, comprising balancing said rotary system characterized by providing a substantially circular chamber having a fulcrum on an axis of a shaft of said rotary system and being partially filled with an amount of a thixotropic balancing substance The thixotropic balancing substance is able to flow under the influence of the vibration induced by the rotary system. Hence, owing to the vibration, the thixotropic balancing substance distributes itself in the chamber to reduce or minimize the vibration.

United States Patent Application number U.S. Pat. No. 8,516,885A discloses a dynamic balancing system for balancing a rotating object, said dynamic balancing system comprising: an inner body having a first hollow interior area defined through said inner body, and an external threaded section; an outer body having a second hollow interior area defined through said outer body, and an internal threaded section in communication with said second hollow interior area, and at least one race defined in said outer body in communication with said second hollow interior area, said outer body being attachable to said inner body, said second hollow interior area of said outer body being configured to receive said inner body therein, said internal threaded section is engage able with said external threaded section of said inner body; a fastening body having a third hollow interior area defined in said fastening body, said fastening body being configured to be received in said first hollow interior area of said inner body, said third hollow interior area of said fastening body being configured to removably engage with one of the rotating object, and a shaft of the rotating object thereby securing said inner body and said outer body to the rotating object; and at least one weighted mass configured to be received in and travel along said race of said outer body, said weighted mass being configured to travel to an outermost diameter of said race due to a centrifugal force produced by rotation of the rotating object, thereby balancing the rotating object.

While above cited references disclose different methods and systems for dynamically balancing a rotating part, there is a need for a simpler and cost effective mechanism for self-balancing a rotating part, especially along a given axis such as along an axis defined by blades of two blade propeller.

There is, therefore, a need to provide an efficient mechanism that neutralize unbalance mass thereby reducing vibrations overcoming deficiencies of devices known in the art.

OBJECTS OF THE INVENTION

A general object of the present disclosure is to improve system stability and reliability by reducing vibrations, caused by centrifugal force acting on imbalanced mass on a rotating part.

An object of the present disclosure is to provide a mechanism for self-balancing that neutralizes any unbalance along a given direction on a rotating part.

An object of the present disclosure is to provide a mechanism for self-balancing that does not require any external command or power to neutralize unbalance in a rotating part.

Another object of the present disclosure is to provide a purely mechanical means for self-balancing.

Another object of the present disclosure is to utilize linear motion of the rotating part caused by centrifugal forces that arises as a consequence of the unbalance mass, to neutralize the unbalance thereby resulting in self-balancing.

These and other objects of the present invention will become readily apparent from the following detailed description taken in conjunction with the accompanying drawings.

SUMMARY

Aspects of the present disclosure relate to rotary systems. In particular, the present disclosure provides a device for self-balancing of a rotating part an Aerial Vehicle (AV) such as an Unmanned Aerial Vehicle (UAV) that automatically balances centrifugal imbalances arising due to shifting of Center of Gravity (CG) of propeller of rotor system of the AV.

In an aspect, the present disclosure provides a mechanism to neutralize any unbalance mass by using linear motion of the rotating part caused by centrifugal forces that arise as a consequence of the unbalance mass. For this, the rotating part is provided a freedom for linear movement in direction of likely occurrence of the unbalance, and linkages that utilize the linear movement of the rotating part to move one or more pairs of balancing weights in a manner that neutralizes the unbalance thereby providing a self-balancing functionality.

In an aspect, rotating part is operatively coupled to a drive shaft (say an output shaft of a motor) through a mounting plate for rotation along with the shaft with freedom for linearly movement along a given direction (hereinafter referred to as longitudinal axis) in plane of rotation of the rotating part, under force acting generally along the longitudinal axis being caused by an unbalance mass on the rotating part.

In an aspect, the disclosed device further comprises at least one pair of levers to function as linkages to utilize the above stated linear movement of rotating part, to move at least one pair of balancing weights in a manner that neutralizes the unbalance thereby providing a self-balancing functionality. Each pair of levers comprises a first lever and a second lever, each lever having a first end and a second end. Each of the first lever and the second lever is pivotally mounted on mounting plate at two diametrically opposite points. Pivot point on the first lever and the second lever is located at a point intermediate of the respective first end and the second end.

In an aspect, said at least one pair of weights comprises two weights, each of the two weights, fixed at said first ends of said at least one pair of levers.

In an aspect, second ends of levers are operatively coupled to rotating part such that when the rotating part undergoes a linear movement in any direction along the longitudinal axis under influence of an unbalance, second ends of the levers are moved to cause balancing weights, fixed at first ends of the levers, to move to neutralize the unbalance in the rotating part.

In an aspect, mounting plate incorporates a square shaft that engages with a slot in a support disc that is fixed to rotating part to impart rotational movement of the mounting plate to the rotating part and allow linear movement of the rotating part along the direction of the slot. The slot is oriented along the longitudinal direction of the rotating part.

In a first embodiment, the disclosed device can have a single pair of levers comprising the first lever and the second lever, and the first lever and the second lever can be arranged in an orientation that is transverse to the longitudinal direction with one lever pivotally fixed at two diametrically opposite positions. The second ends of the levers can be operatively coupled to rotating part such that the second end moves in same direction as movement of the rotating part causing the first ends, which are located on opposite sides of the respective pivot points, to move in direction opposite to direction of movement of the rotating part thereby neutralizing unbalance in the rotating part.

In an aspect of the first embodiment, coupling of the second ends of the levers to rotating part can be through ball shaped weights (also referred to as inner weights and the terms used interchangeably hereinafter) fixed on the second ends that engage with corresponding slots in support disc. Therefore, when the support disc undergoes linear movement along with the rotating part, engagement of the ball shaped/inner weights with the slots results in movement of the second ends in same direction as movement of the rotating part. In an aspect, the ball, shaped/inner weights are kept lighter than the weights fixed on the first ends.

In a second embodiment, the disclosed device can have two pairs of levers, and first levers and the second levers of the two pairs are respectively pivoted on two separate pivot points such as a first pivot point and a second pivot point to form two scissor configurations. The first pivot point and the second pivot point are located on the longitudinal axis along the given longitudinal axis, thus positioning one of the two scissor configurations on either side from centre of the rotating part along the longitudinal axis. In addition, the first levers and the second levers are biased to remain towards closed position of the respective scissor configurations.

In an aspect of the second embodiment, second ends of levers are operatively coupled to the rotating part such that when rotating part under goes linear movement along longitudinal axis, scissor configuration located towards the direction of linear movement of the rotating part undergoes opening movement, and the scissor configuration located opposite the direction of linear movement of the rotating part undergoes closing movement. Thus movement of weights located at first ends of the levers works to neutralize the unbalance on the rotating part.

In another aspect of the second embodiment, the disclosed device further incorporates weights (inner weights) fixed at second ends of the levers, and the inner weights fixed on the second ends are lighter than the weights fixed on the first end.

In an, embodiment of application, the proposed device can be implemented on a propeller assembly of an aerial vehicle having two propeller blades that are arranged in diametrically opposite disposition and define a longitudinal axis. As would be appreciated by those skilled in the related art that owing to geometrical shape of the propeller comprising two blades, the longitudinal axis that runs along the two blades shall be the direction of likely occurrence of the unbalance.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Embodiments of the present disclosure relate to a device for self-balancing of a rotating part that automatically balances any unbalance mass using mechanism that utilizes linear motion of the rotating part caused by centrifugal force that arises as a consequence of the unbalance mass, to move one or more balancing weights in a direction such that unbalance is neutralized thereby needing no external command and source of power.

In an embodiment, rotating part is provided a freedom for linear movement in direction of likely occurrence of the unbalance, and linkages that utilize the linear movement of the rotating part to move balancing weights in a manner that neutralizes the unbalance thereby providing a self-balancing functionality.

The proposed concept can be applied on a propeller assembly of an aerial vehicle having two propeller blades that are arranged in diametrically opposite disposition and define a longitudinal axis. As would be appreciated by those skilled in the related art that owing to geometrical shape of the propeller comprising two blades, the longitudinal axis that runs along the two blades shall be the direction of likely occurrence of the unbalance.

It is to be appreciated that though embodiments have been explained with reference to a propeller, they can as well be applied to any other rotating part to provide self-balancing functionality along a given axis, and all such applications are well within the scope of the present application without any limitation whatsoever.

In an embodiment, propeller can be operatively coupled to a drive shaft through a mounting plate for rotation along with the shaft with freedom for linearly movement along longitudinal axis under force acting generally along the longitudinal axis being caused by an unbalance mass on any of the two propeller blades.

In an embodiment, mounting plate incorporates a square shaft that engages with a slot in a support disc that is fixed to the propeller to impart rotational movement of the mounting plate to the propeller and allow linear movement of the propeller along the direction of the slot. The slot is oriented along the longitudinal direction of the propeller to provide freedom for linear movement to the propeller in the longitudinal which is the direction of likely occurrence of the unbalance.

In an embodiment, linkages to transfer linear movement of the propeller to balancing weights to provide a self-balancing functionality are at least one pair of levers. Each pair of levers can comprise a first lever and a second lever, each lever having a first end (also referred to as external end) and a second, end (also referred to as inner end). Each of the first lever and the second lever can be pivotally mounted on mounting plate at two diametrically opposite points. Pivot point on the first lever and the second lever is located at a point intermediate of the respective first/external end and the second/inner end.

In an embodiment, weights that move to neutralize unbalance in propeller are fixed at the first ends/external ends of each of the levers.

In an aspect, second ends/inner ends of levers are operatively coupled to propeller such that when the propeller undergoes a linear movement in any direction along the longitudinal axis under influence of an unbalance in the propeller, second/external ends of the levers are moved in opposite direction on account of fulcrum/pivot between the two ends causing weights fixed at first/external ends of the levers to provide a balancing centrifugal force to neutralize centrifugal force due to unbalance in the propeller.

In a first embodiment, the disclosed propeller assembly can have a single pair of levers comprising a first lever and a second lever, and the first lever and the second lever can be arranged in an orientation that is transverse to longitudinal direction of propeller with one lever pivotally fixed on each of the two diametrically opposite positions. Second ends of the levers can be operatively coupled to propeller such that the second end moves in same direction as movement of the propeller causing the first ends, being located on opposite side of the respective pivot points, to move in direction opposite to direction of movement of the propeller thereby neutralizing unbalance in the propeller.

In an aspect of the first embodiment, coupling of the second ends of the levers to the propeller can be through ball shaped/inner weights fixed on the second ends that engage with corresponding slots in support disc. Therefore, when the support disc undergoes linear movement along with the propeller, engagement of the inner weights with the slots results in movement of the second ends in same direction as movement of the propeller. In an aspect, the inner weights are kept lighter than the weights fixed on the first ends.

In a second embodiment, the disclosed propeller assembly can have two pairs of levers, and first levers and second levers of the two pairs can be respectively pivoted on two separate pivot points, such as a first pivot point and a second pivot point, to form two scissor configurations. The first pivot point and the second pivot point are located on the longitudinal axis along direction of the two propeller blades thus positioning one of the two scissor configurations on either side from centre of the propeller along the longitudinal axis. In addition, the first levers and the second levers are biased to remain towards closed position of the respective scissor configurations.

In an aspect of the second embodiment, second ends of levers are operatively coupled to the propeller such that when the propeller undergoes linear movement, scissor configuration located towards the direction of linear movement of the propeller undergoes opening movement, and the scissor configuration located opposite the direction of linear movement of the propeller undergoes closing movement. Thus movement of weights located at first ends of the levers works to neutralize the unbalance on the propeller.

Figure 1:
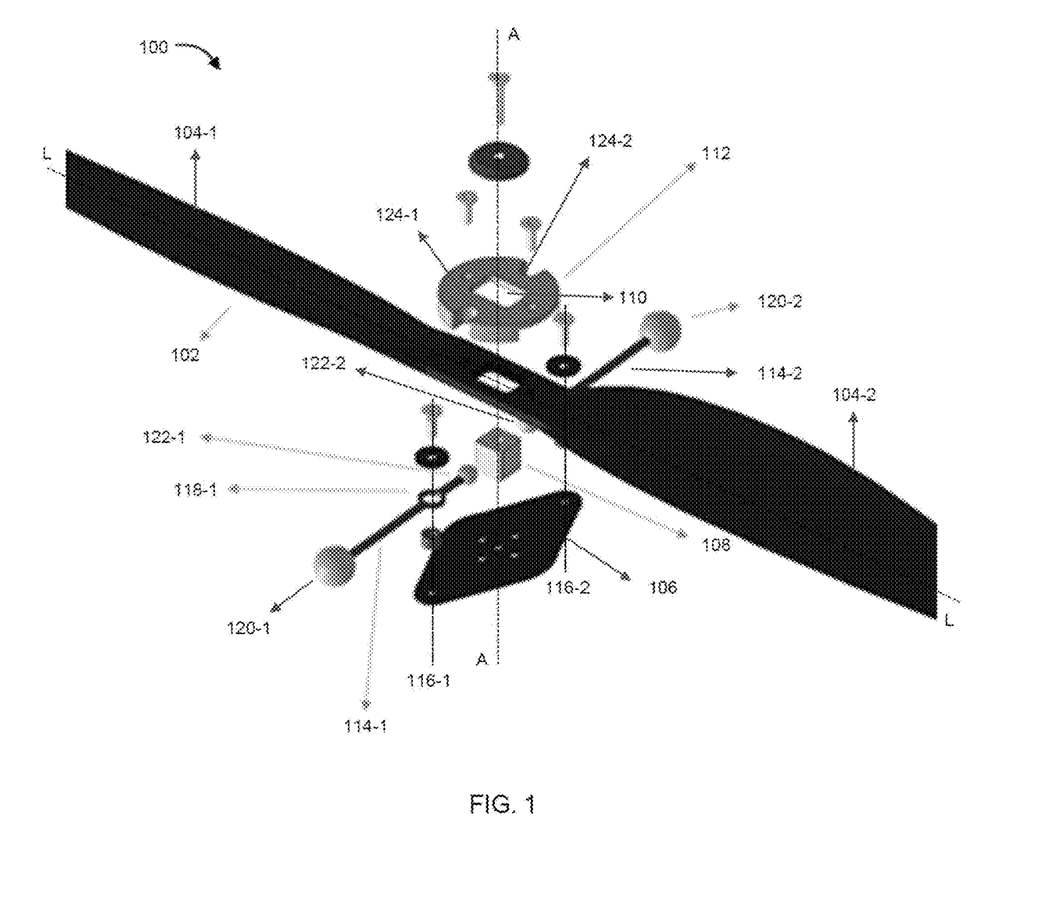
FIG. 1 illustrates an exemplary exploded view of configuration in accordance with first embodiment of the proposed concept for self-balancing propeller assembly.
Figure 2:
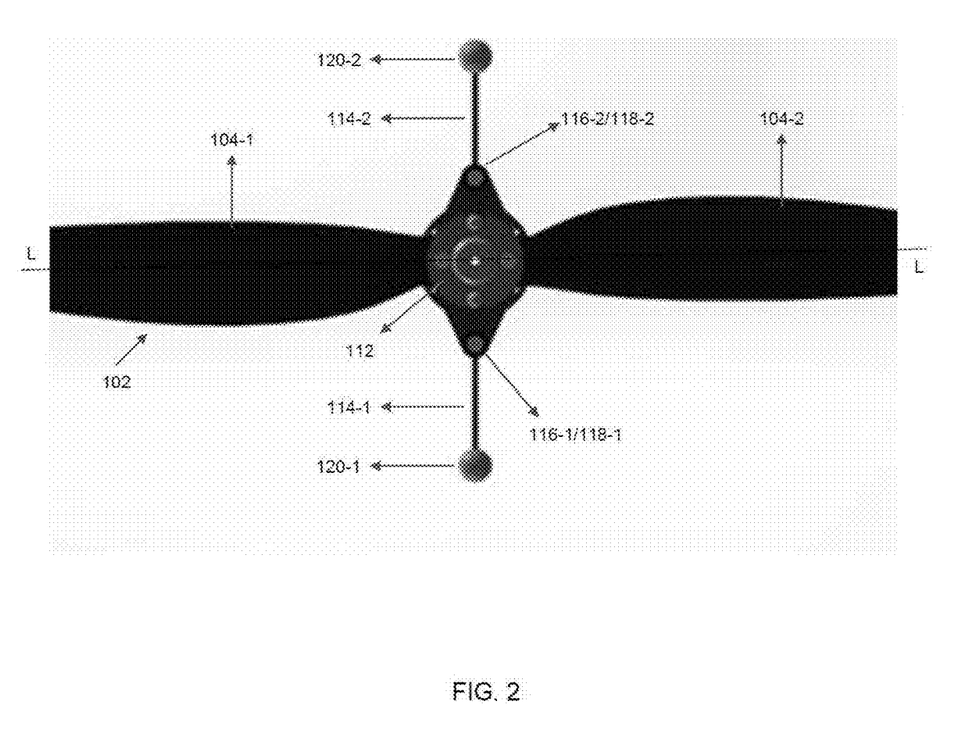
FIG. 2 illustrates an exemplary top view of the disclosed self-balancing propeller assembly in accordance with first embodiment of the present disclosure.
Figure 3:
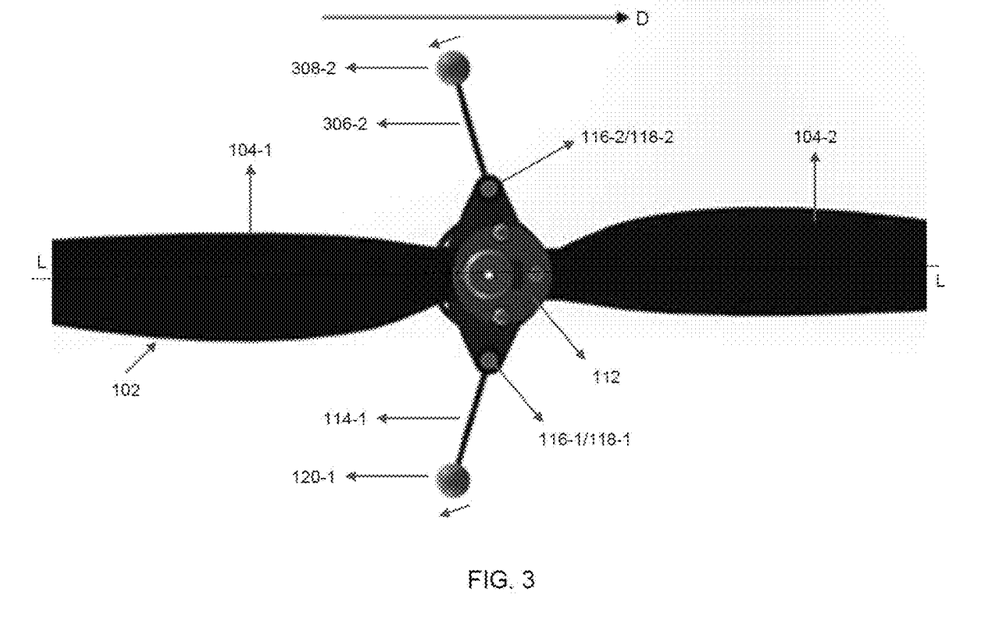
FIG. 3 illustrates another exemplary top view showing working of the disclosed self-balancing propeller assembly in accordance with first embodiment of the present disclosure.

Referring now to FIGS. 1, 2 and 3 that illustrate different exemplary views of first embodiment of the proposed concept for self-balancing propeller assembly, the self-balancing propeller assembly 100 in accordance with the first embodiment can incorporate a propeller 102 having two propeller blades 104-1 and 104-2 (collectively referred to as propeller blades 104) that are arranged in diametrically opposite disposition and define a longitudinal axis L-L. The propeller 102 is operatively coupled to a drive shaft (not shown here but that runs along axis A-A and transfers power from a motor to the propeller 102 and can be output shaft of the motor) through a mounting plate 106 for rotation, along with the shaft with freedom for linearly movement along the longitudinal axis L-L under a force acting generally along the longitudinal axis L-L being caused by an unbalance mass on any of the two propeller blades 104.

In an embodiment, mounting plate 106 incorporates a square shaft 108 that engages with a slot 110 in a support disc 112 that is fixed to the propeller 102 to impart rotational movement of the mounting plate 106 to the propeller 102 and allow linear movement of the propeller 102 along the direction of the slot 110. The slot 110 is oriented along the longitudinal direction L-L of the propeller to provide freedom for linear movement to the propeller 102 in the longitudinal direction L-L which is the direction of likely occurrence of any unbalance.

In an embodiment, the proposed self-balancing propeller assembly 100 further incorporates a pair of levers comprising a first lever 114-1 and a second lever 114-2 (collectively referred to as a pair of levers 114 or simply as levers 114) that act as linkages to transfer linear movement of the propeller 102 to balancing weights to provide a self-balancing functionality. Each of the levers 114 can be pivotally mounted through a pivot point such as 118-1 and 118-2 (118-2 not shown in FIG. 1 being not visible therein) intermediate of its two ends, on mounting plate 106 at two diametrically opposite points 116-1 and 116-2 as shown in exploded view in FIG. 1.

In an embodiment, the proposed self-balancing propeller assembly 100 further incorporates a pair of weights 120-1 and 120-2 (collectively referred to a weights 120) at external ends (also referred to as first end) of each of the levers 114. The weights 120 provide functionality of neutralizing centrifugal force due to unbalance on the propeller by movement caused by levers 114 from their neutral positions.

In an aspect, inner ends (also referred to as second ends) of levers 114 are operatively coupled to propeller 102 through inner weights 122-1 and 122-2 (collectively referred to as 122) fixed on the second/inner ends that engage with corresponding slots 124-1 and 124-2 (collectively referred to as 124) in support disc 112. Therefore, when the support disc 112 undergoes linear movement along with the propeller 102, engagement of the inner weights 122 with the slots 124 results in movement of the second ends of levers 114 in same direction as movement of the propeller 102. In an aspect, the inner weights 122 are kept lighter than the weights 120 fixed on the first/external ends.

FIG. 3 shows working of the disclosed self-balancing propeller assembly 100 of first embodiment of the present disclosure. As shown when the propeller 102 undergoes a linear movement in any direction such as shown by D along the longitudinal axis L-L under influence of an unbalance in the propeller 102, the second/external ends of the levers 114 are moved in opposite direction on, account of fulcrum/pivot 116/118 causing weights 120 fixed at first/external ends of the levers 114 to provide a balancing centrifugal force to neutralize centrifugal force due to unbalance in the propeller 102.

Figure 4:
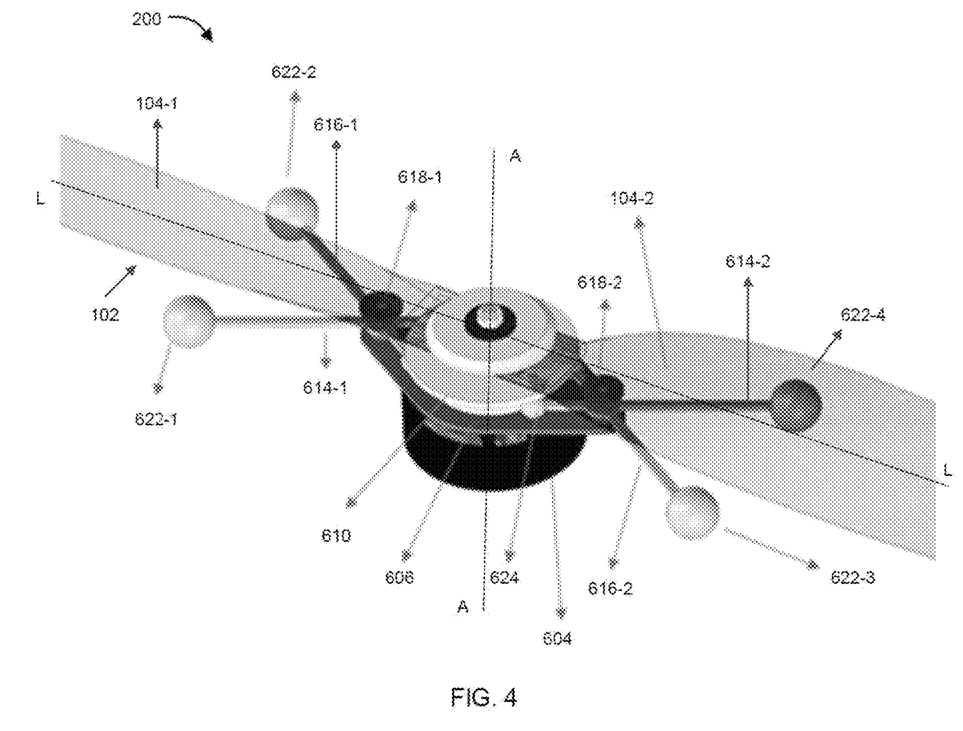
FIG. 4 illustrates an exemplary isometric view of configuration in accordance with second embodiment of the proposed concept for self-balancing propeller assembly.
Figure 5:
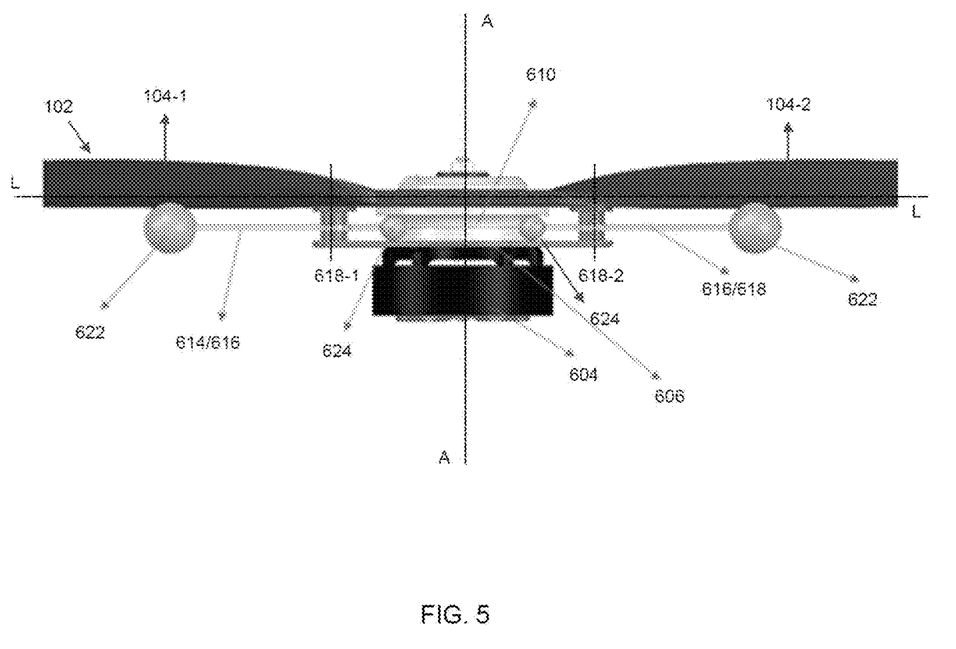
FIG. 5 illustrates an exemplary side view of the disclosed self-balancing propeller assembly in accordance with second embodiment of the present disclosure.
Figure 6:
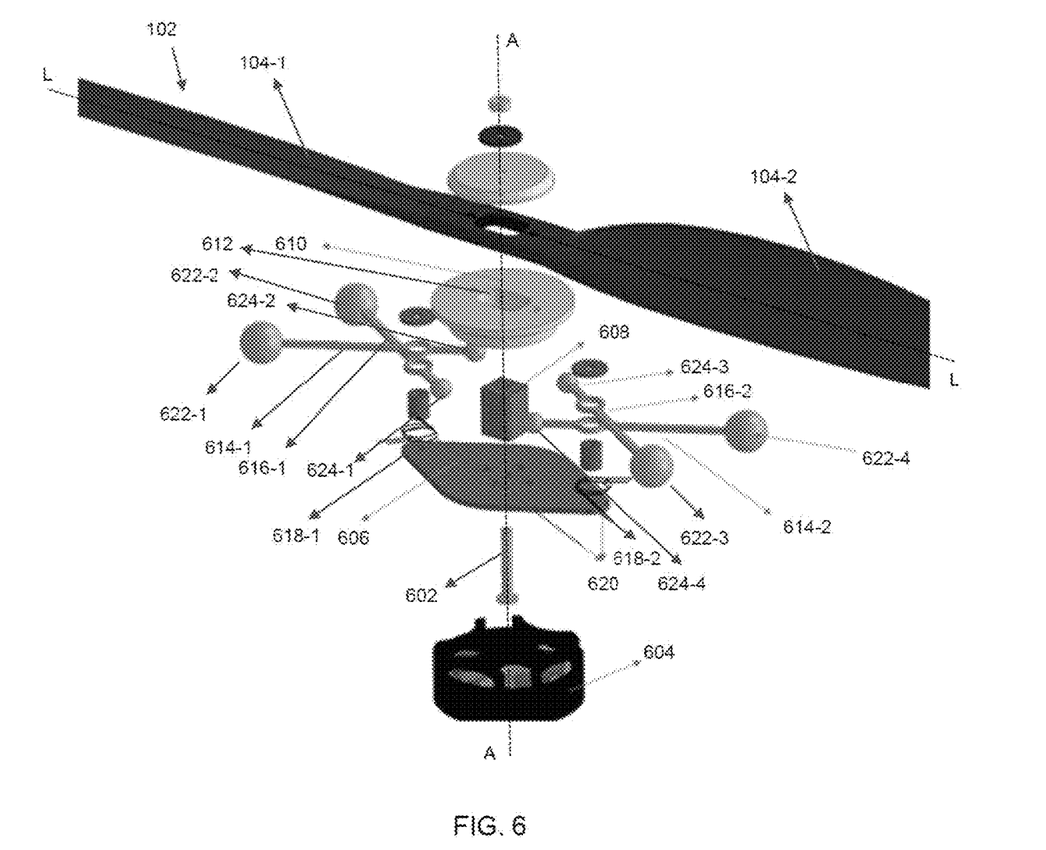
FIG. 6 illustrates an exemplary exploded representation of the disclosed self-balancing propeller assembly in accordance with second embodiment of the present disclosure.

Referring now to FIGS. 4, 5 and 6 that illustrate different exemplary views of second embodiment of the proposed concept for self-balancing propeller assembly, the self-balancing propeller assembly 200 in accordance with the second embodiment can incorporate propeller similar to propeller 102 of first embodiment, i.e. having two propeller blades 104-1 and 104-2 that are arranged in diametrically opposite disposition and define a longitudinal axis L-L. The propeller 102 is operatively coupled to a drive shaft 602 (refer to FIG. 6) that runs along axis A-A and transfers power from motor 604 to the propeller 102 and can be output shaft of the motor) through a mounting plate 606 for rotation along with the shaft 602 with freedom for linear movement along the longitudinal axis L-L under a force acting generally along the longitudinal axis L-L being caused by an unbalance mass on any of the two propeller blades 104.

In same manner as in the first embodiment, mounting plate 606 incorporates a square shaft 608 that engages with slot 612 in support disc 610 that is fixed to the propeller 102 to impart rotational movement of the mounting plate 606 to the propeller 102 and allow linear movement of the propeller 102 along the direction of the slot 612. The slot 612 is oriented along the longitudinal direction L-L of the propeller 102 to provide freedom for linear movement to the propeller 102 in the longitudinal direction L-L which is the direction of likely occurrence of any unbalance.

In an embodiment, the proposed self-balancing propeller assembly 200 further incorporates two pairs of levers each pair comprising a first lever 614-1/616-1 and a second lever 614-2/616-2 (collectively referred to as a pair of levers 614 and 616 or simply as levers 614/616) that act as linkages to transfer linear movement of the propeller 102 to a set of balancing weights to provide a self-balancing functionality.

In an embodiment, first levers 614-1/616-1 and the second levers 614-2/616-2 of the two pairs of levers 614/616 are respectively pivoted on two separate pivot points on the mounting plate 606, such as a first pivot point 618-1 and a second pivot point 618-2, to form two scissor configurations. The first pivot point 618-1 and the second pivot point 618-2 are located along the longitudinal axis L-L along direction of the two propeller blades 104 thus positioning one of the two scissor configurations on either side from centre of the propeller along the longitudinal axis L-L. In addition, the first levers 614 and the second levers 616 are biased by springs 620 to remain towards closed position of the respective scissor configurations.

Figure 7:
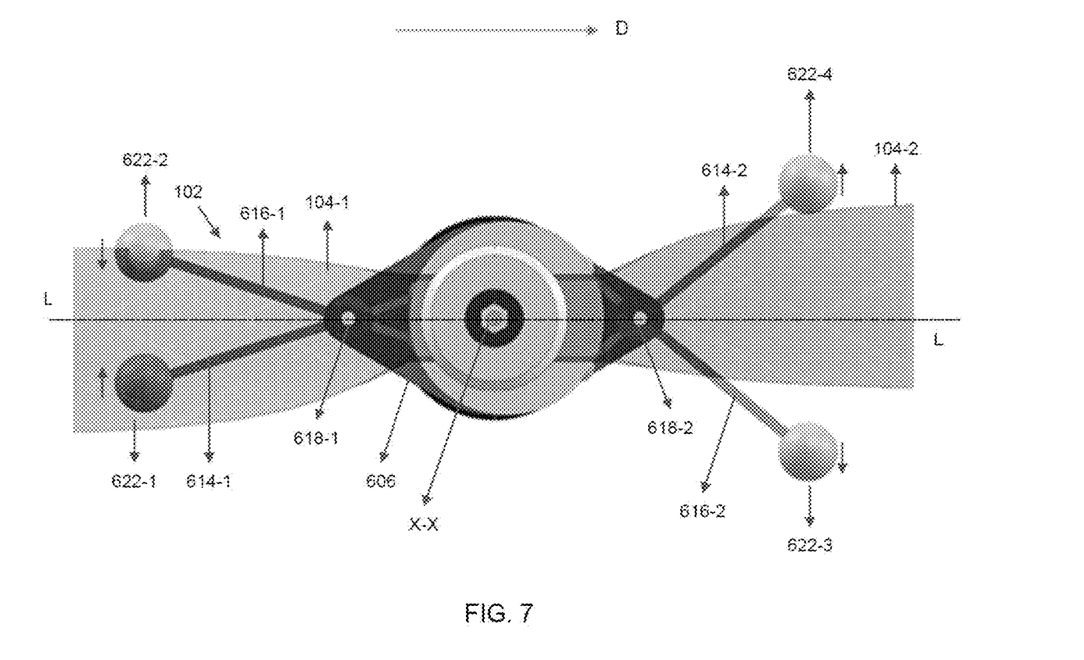
FIG. 7 illustrates an exemplary top view showing working of the disclosed self-balancing propeller assembly in accordance with second embodiment of the present disclosure.

In an aspect of the second embodiment, inner ends (also referred to as second ends) of levers 614/616 are operatively coupled to the propeller 102 such that scissor configuration located towards the direction of linear movement of the propeller undergoes opening movement, and the scissor configuration located opposite the direction of linear movement of the propeller undergoes closing movement as shown in FIG. 7. Thus movement of weights 622-1, 622-2, . . . 622-4 (collectively 622) located at first ends of the levers 614/616 works to neutralize the unbalance on the propeller 102.

In another aspect of the second embodiment, propeller assembly further incorporates weights 624-1, 624-2, . . . 624-4 (collectively 624) fixed at second/inner ends of the levers 614/616, and the weights 624 fixed on the second ends are lighter than the weights fixed on the first end.

As can be appreciated by those skilled in the related art weights that are fixed to the external and inner ends of levers in either embodiment can be chosen based on length of levers and amount of unbalance that the propeller may develop so that when displaced due to movement of the propeller, they provide equal and opposite centrifugal force to neutralizer the unbalance in the propeller.

Thus, the proposed self-balancing propeller assembly reduces vibrations in the rotor system generated on account of centrifugal forces due to shifting of CG of the rotor system. The self-balancing propeller assembly balances the centrifugal imbalance by allowing one or more weights to move in a direction opposite to the direction of shifting of the CG.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure improves system stability and reliability by reducing vibrations caused by centrifugal imbalances produced due to shifting of CG of a propeller.

The present disclosure provides a self-balancing propeller assembly that does not require any external command or power to neutralize unbalance in the propeller.

The present disclosure provides a purely mechanical means for self-balancing of a propeller.

The present disclosure utilizes linear motion of the propeller caused by centrifugal forces that arises as a consequence of the unbalance mass to neutralize the unbalance thereby resulting in self-balancing

I claim:

1. A device for self-balancing a rotating part along a given longitudinal axis in plane of rotation of the rotating part, wherein the device is adapted to allow the rotating part freedom to move along the longitudinal axis, and further comprises linkages to move at least one-pair of balancing weights when the rotating part undergoes movement along the longitudinal axis under a force acting generally along the longitudinal axis being caused by an unbalanced mass on the rotating part;
    wherein the device further incorporates at least a single pair of levers comprising a first lever and a second lever, and the first lever and the second lever are arranged transverse to the longitudinal direction of the rotating part on diametrically opposite sides;
    wherein the movement of the pair of balancing weights results in providing a balancing force that neutralizes force caused by the unbalanced mass on the rotating part;
    wherein the freedom to the rotating part for linear movement along the longitudinal axis is provided by a mounting plate that operatively couples the rotating part to a drive shaft for rotation along with the shaft; and
    wherein the mounting plate incorporates a square shaft that engages with a slot in a support disc that is fixed to the rotating part to impart rotational movement of the mounting plate to the rotating part.

2. The device as claimed in claim 1, wherein the square shaft that engages with the slot also allows linear movement of the rotating part along the direction of the slot, and wherein the slot is oriented along the longitudinal direction of the rotating part.

3. The device as claimed in claim 2, wherein the linkages include at least one pair of levers, each pair comprising a first lever and a second lever, each lever having a first end and a second end; each of the first lever and the second lever pivotally mounted on the mounting plate at two diametrically opposite points, pivot point on the first lever and the second lever being a point intermediate of the respective first end and the second end;
    wherein the at least one pair of weights comprises two weights, and each of the two weights is fixed at the first ends of the at least one pair of levers; and
    wherein the second ends of the at least one pair of levers are operatively coupled to the rotating part such that when the rotating part undergoes the linear movement in any direction along the longitudinal axis under influence of the unbalance in the rotating part, the second ends of the at least one pair of levers are moved to cause the at least one pair of weights fixed at the first ends of the at least one pair of levers to move to provide the balancing force to neutralize the unbalance in the rotating part.

4. The device as claimed in claim 3, wherein the second ends of the first lever and the second lever are operatively coupled to the rotating part such that the second end moves in same direction as movement of the rotating part causing the first ends, being located on opposite side of the respective pivot points, to move in direction opposite to direction of movement of the rotating part.

5. The device as claimed in claim 4, wherein the coupling of the second ends of the levers to the rotating part is through inner weights fixed on the second ends that engage with corresponding slots in the support disc; wherein when the support disc undergoes linear movement along with the rotating part, engagement of the inner weights with the slots results in movement of the second ends in same direction as movement of the rotating part.

6. The device as claimed in claim 5, wherein the inner weights are lighter than the weights fixed on the first ends.

7. The device as claimed in claim 3, wherein the device incorporates two pairs of levers, and the first levers of the two pairs are pivoted on a common first pivot point, and the second levers of the two pairs are pivoted on a common second pivot point thus forming two scissor configurations.

8. The device as claimed in claim 7, wherein the first pivot point and the second pivot point are located on the longitudinal axis thus positioning one of the two scissor configurations on either side from centre of the rotating part along the longitudinal axis.

9. The device as claimed in claim 7, wherein the first levers and the second levers are biased to remain towards closed position of the respective scissor configurations.

10. The device as claimed in claim 8, wherein the second ends of the lever are operatively coupled to the rotating part such that the scissor configuration located towards the direction of linear movement of the rotating part, undergoes opening movement, and the scissor configuration located opposite the direction of linear movement of the rotating part, undergoes closing movement.

11. The device as claimed in claim 10, wherein the device further incorporates weights fixed at the second ends of the first levers and the second levers, and wherein the weights fixed on the second ends are lighter than the weights fixed on the first end.

12. The device as claimed in claim 1, wherein the rotating part is a propeller having two propeller blades, the two propeller blades arranged in diametrically opposite disposition and defining the longitudinal axis.

* * * * *